United States Patent [19]
Hatch et al.

[11] Patent Number: 5,303,101
[45] Date of Patent: Apr. 12, 1994

[54] ACTIVE MAGNETIC LATCH FOR DISK DRIVE AND METHOD

[75] Inventors: Michael R. Hatch, Palo Alto; Ronald R. Moon, Los Gatos; Robert P. Cloutier, Campbell, all of Calif.

[73] Assignee: NEC Corporation, Tokyo, Japan

[21] Appl. No.: 851,372

[22] Filed: Mar. 10, 1992

[51] Int. Cl.$^5$ .............................................. G11B 5/54
[52] U.S. Cl. ................................................... 360/105
[58] Field of Search .............................. 360/105, 75

[56] References Cited

U.S. PATENT DOCUMENTS

| | | |
|---|---|---|
| 4,594,627 | 6/1986 | Viskochil et al. |
| 4,654,735 | 3/1987 | Izraelev et al. |
| 4,679,102 | 7/1987 | Wevers et al. |
| 4,706,142 | 11/1987 | Hottori et al. |
| 4,751,595 | 6/1988 | Kishi et al. |
| 4,881,139 | 11/1989 | Hazebrouck ........................ 360/105 |
| 4,890,176 | 12/1989 | Casey et al. |
| 4,985,793 | 1/1991 | Anderson ............................ 360/105 |
| 5,023,736 | 6/1991 | Kelsic et al. |
| 5,034,837 | 7/1991 | Schmitz . |
| 5,170,300 | 12/1992 | Stefansky . |
| 5,187,627 | 2/1993 | Hickox et al. ....................... 360/105 |

OTHER PUBLICATIONS

Patent Abstract vol. 7, No. 127 (P-201) of Japanese Patent No. 58-45670 dated Jun. 3, 1983.

*Primary Examiner*—Edward K. Look
*Assistant Examiner*—Christopher Verdier
*Attorney, Agent, or Firm*—Skjerven, Morrill, MacPherson, Franklin & Friel

[57] ABSTRACT

When a rotary-actuator voice coil type disk drive is powered down the actuator arm is moved to a parking position against an I.D. stop by a disk spindle motor back EMF, resulting from the spinning down of the spindle motor. Current is applied by the back EMF through a delay circuit to a latch arm voice coil on one end of a latch arm and forming part of a magnetic circuit including a drive permanent magnet on a ferrous base plate and a ferrous upper plate. Resultant movement of the latch arm overcomes a spring bias of a torsion spring extending between the base plate and pivoted latch arm normally keeping the latch arm in an unlatched position. A latch permanent magnet extends from the other end of the latch arm and is brought into spaced proximity, but not contact, with a ferrous member extending from the actuator arm so that the magnetic force therebetween holds the actuator arm against the I.D. stop in latched position to withstand high shock loadings. Powering the rotary actuator voice coil motor up overcomes the magnetic force and allows the biased torsion spring to move the latch arm to the unlatched position without resultant loss of data storage area.

27 Claims, 10 Drawing Sheets

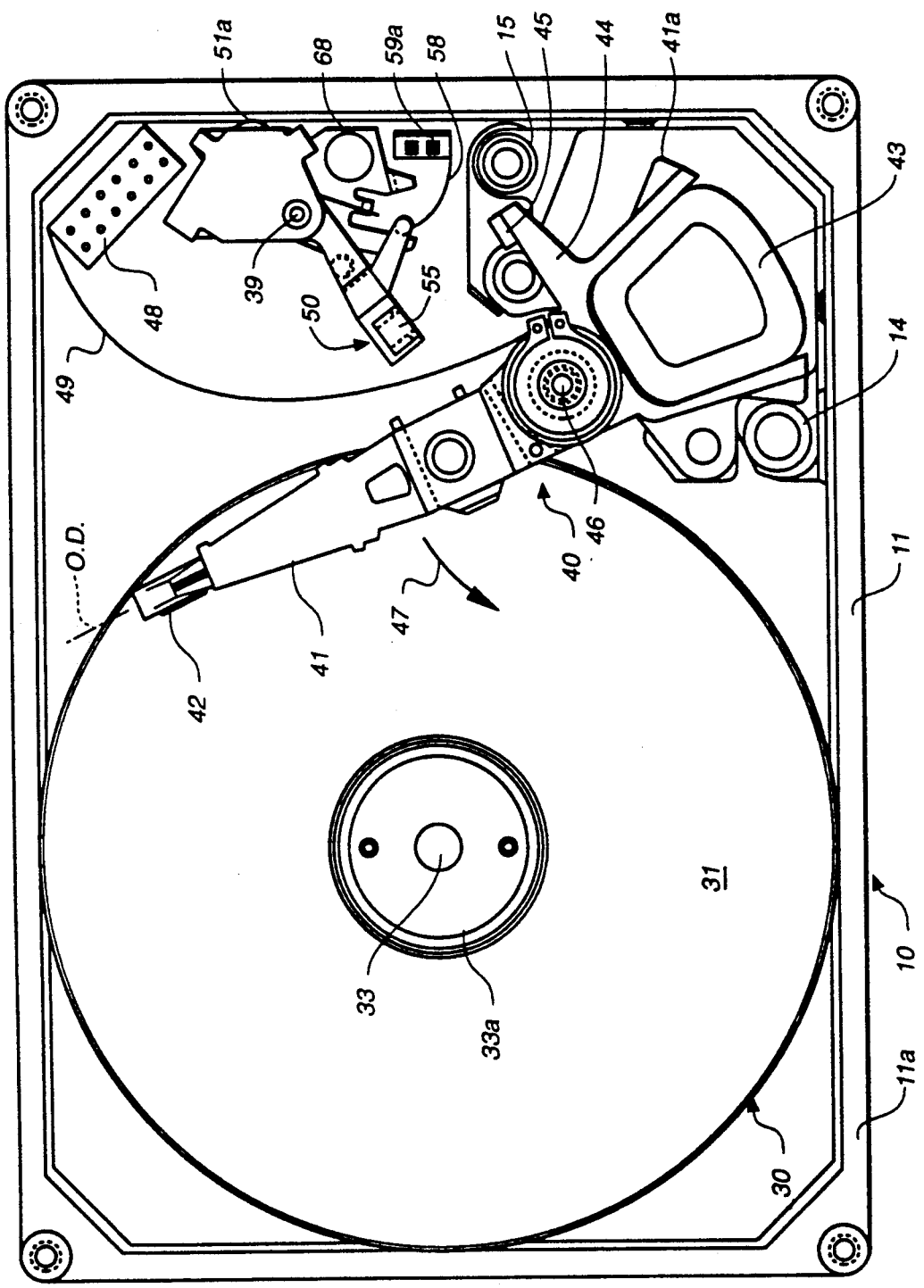
FIG._1

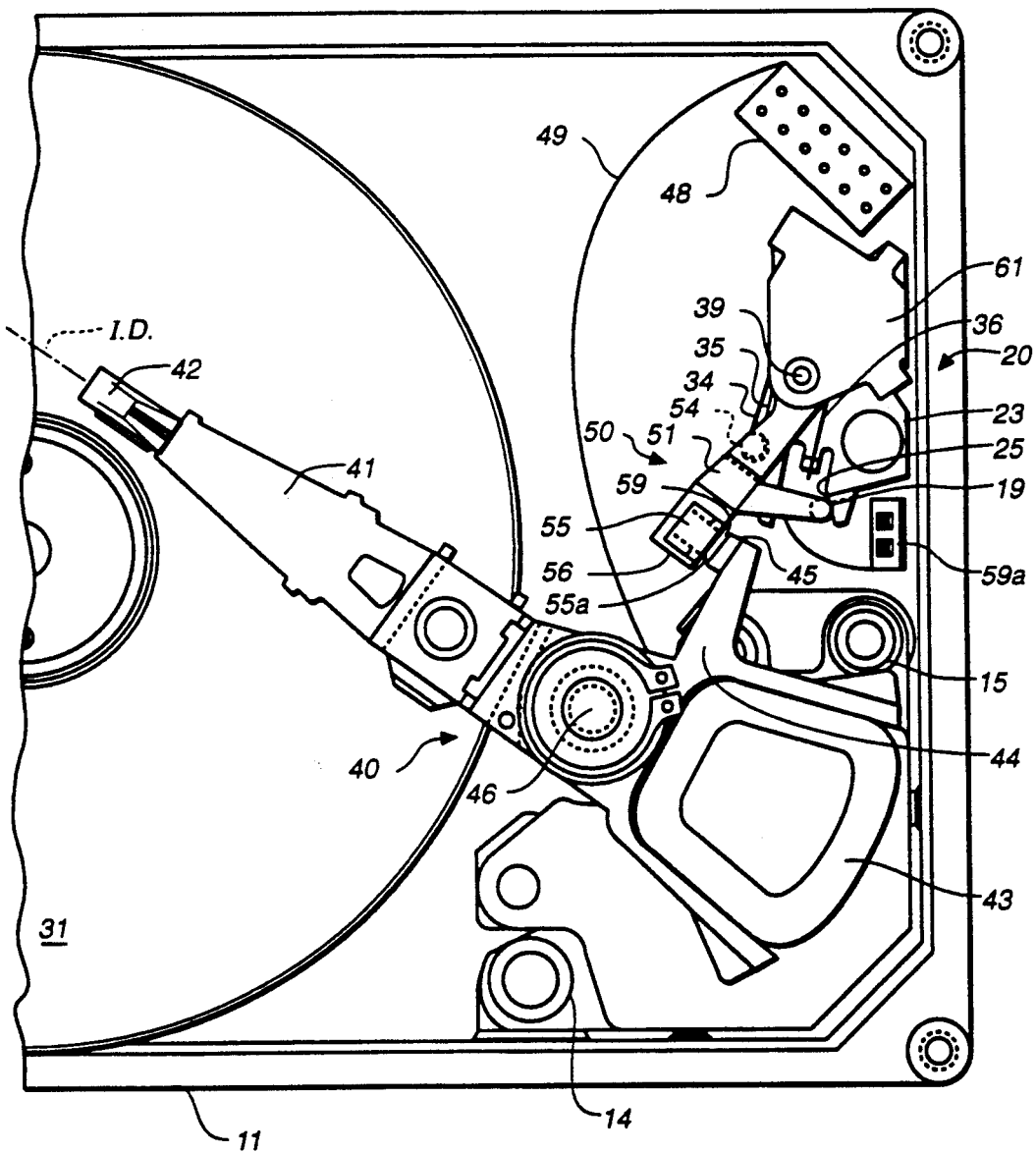
FIG._2

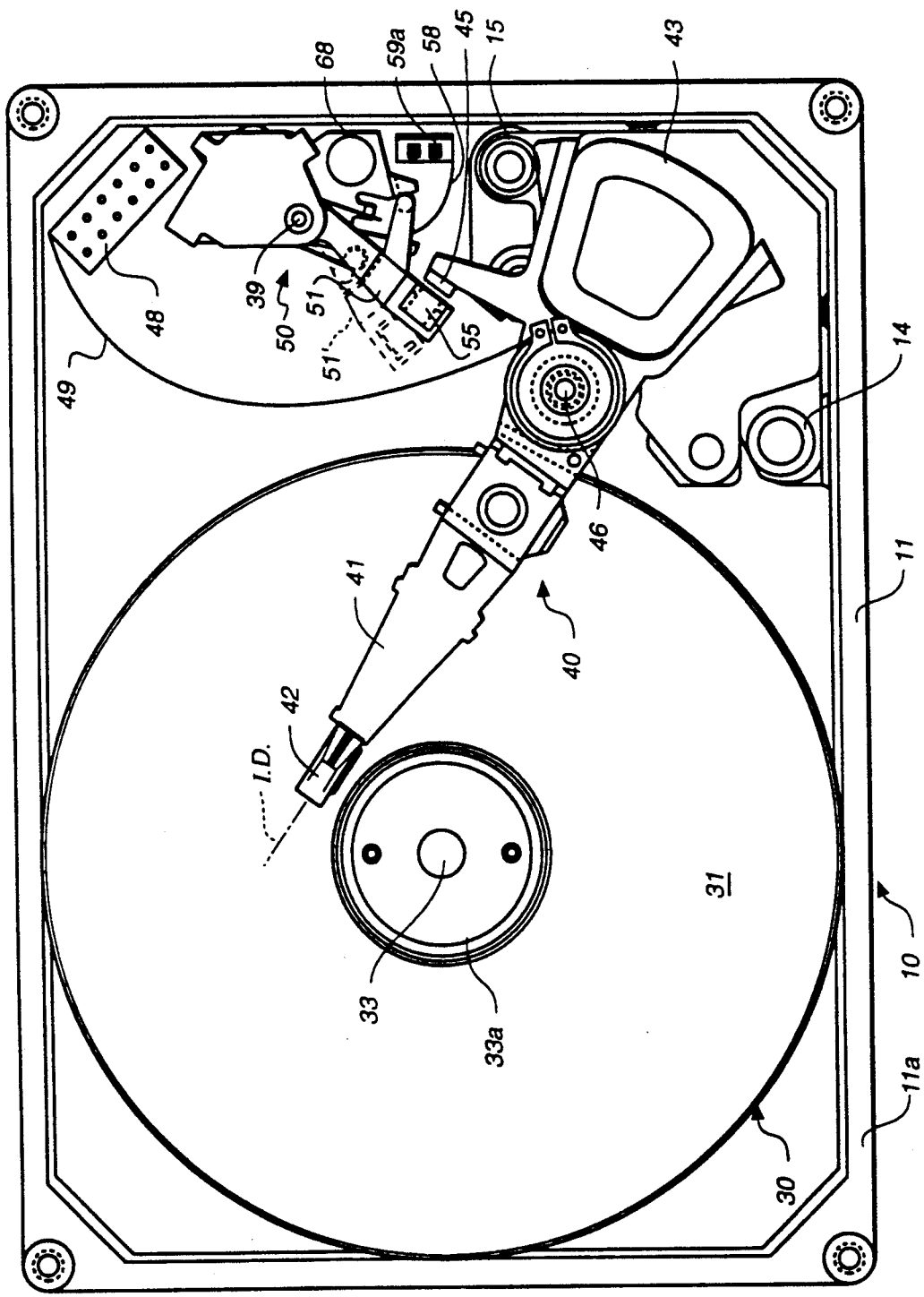
FIG._3

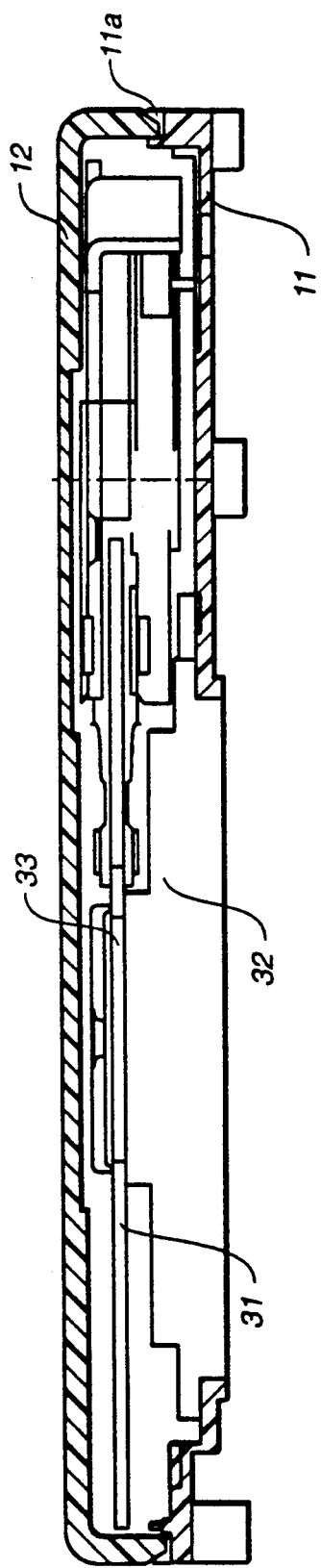
FIG._4

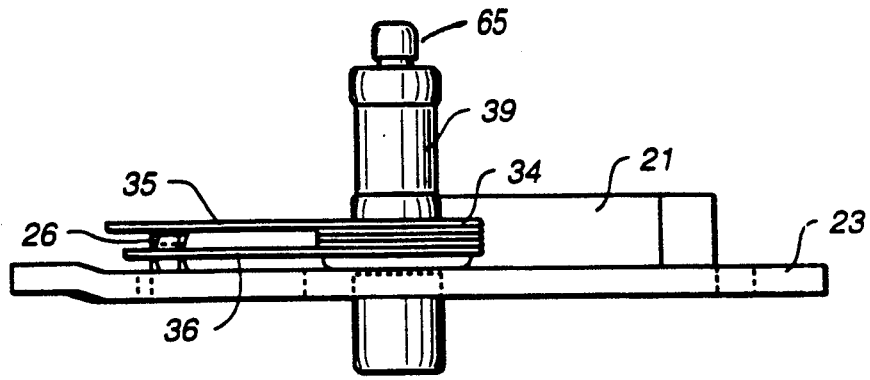
FIG._5
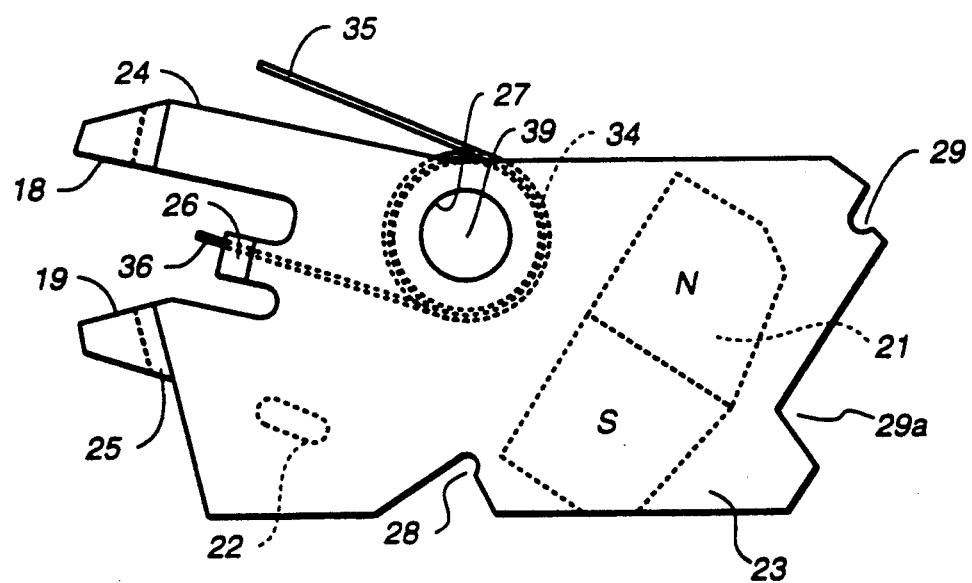
FIG._6

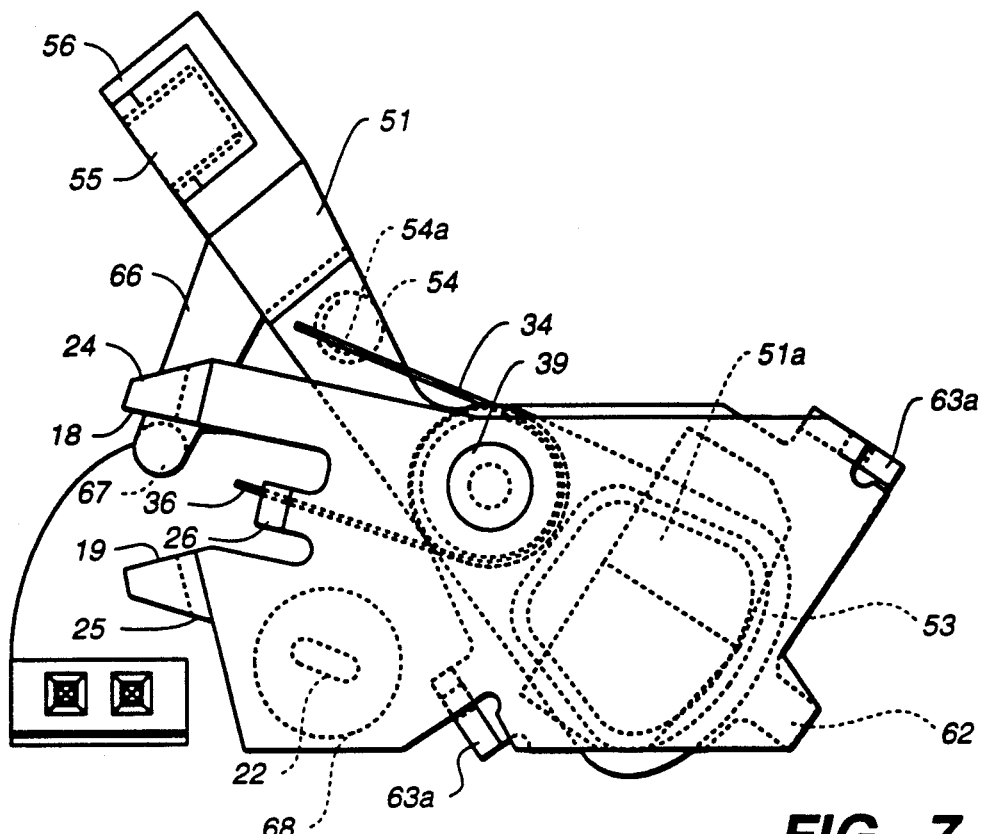
FIG._7
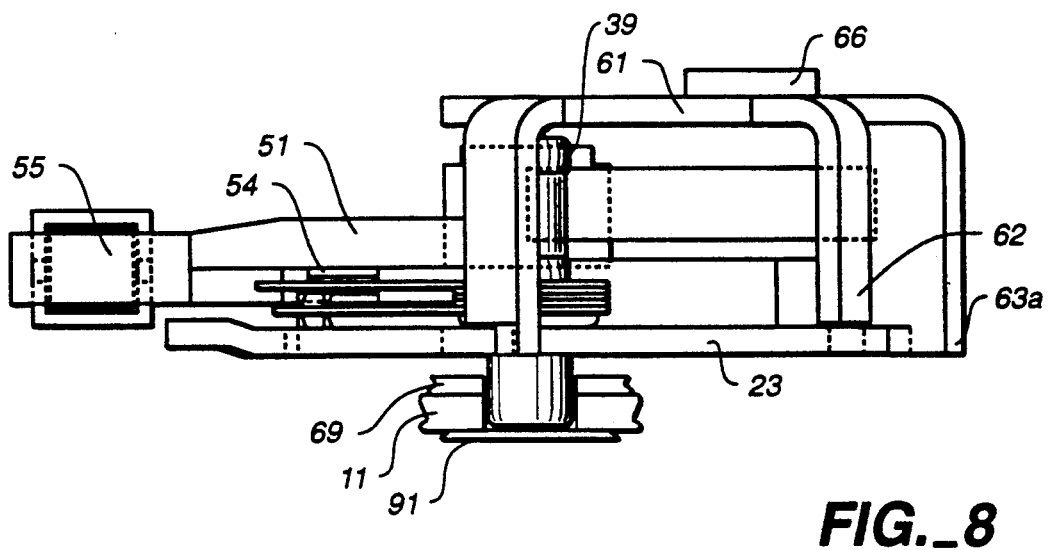
FIG._8

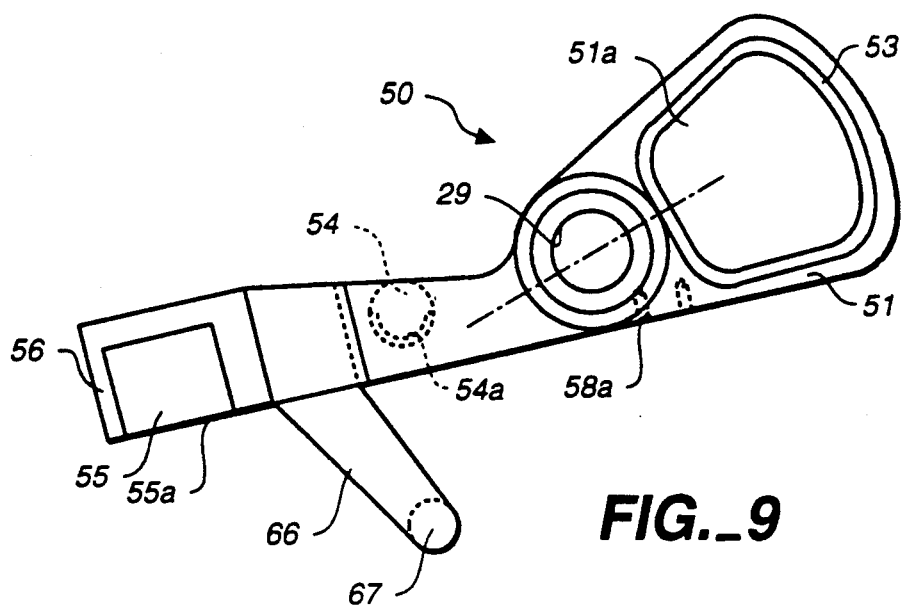
FIG._9
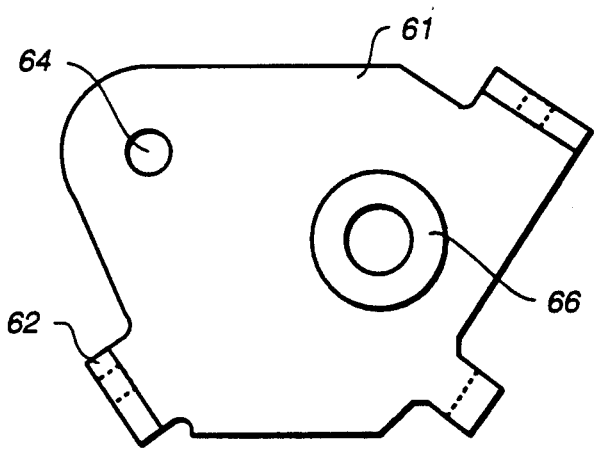
FIG._10
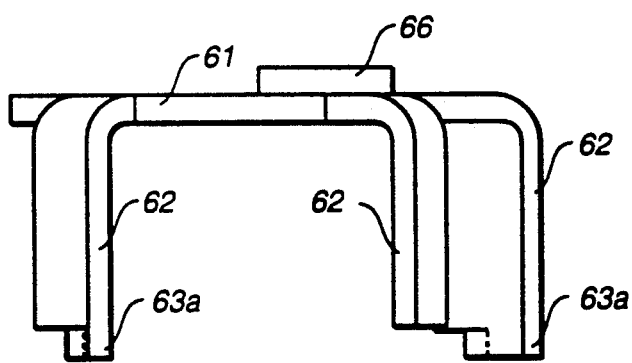
FIG._11

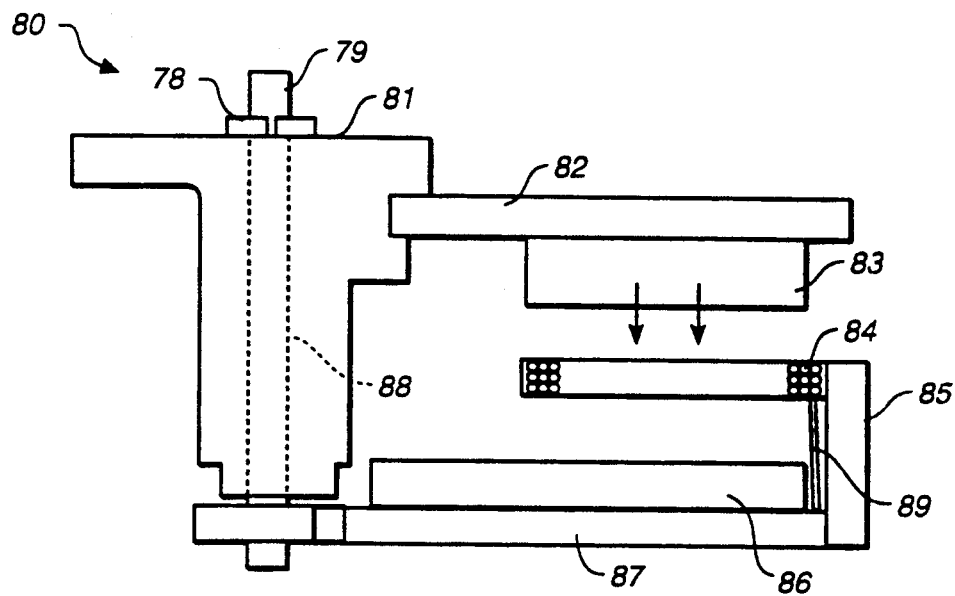
FIG._12
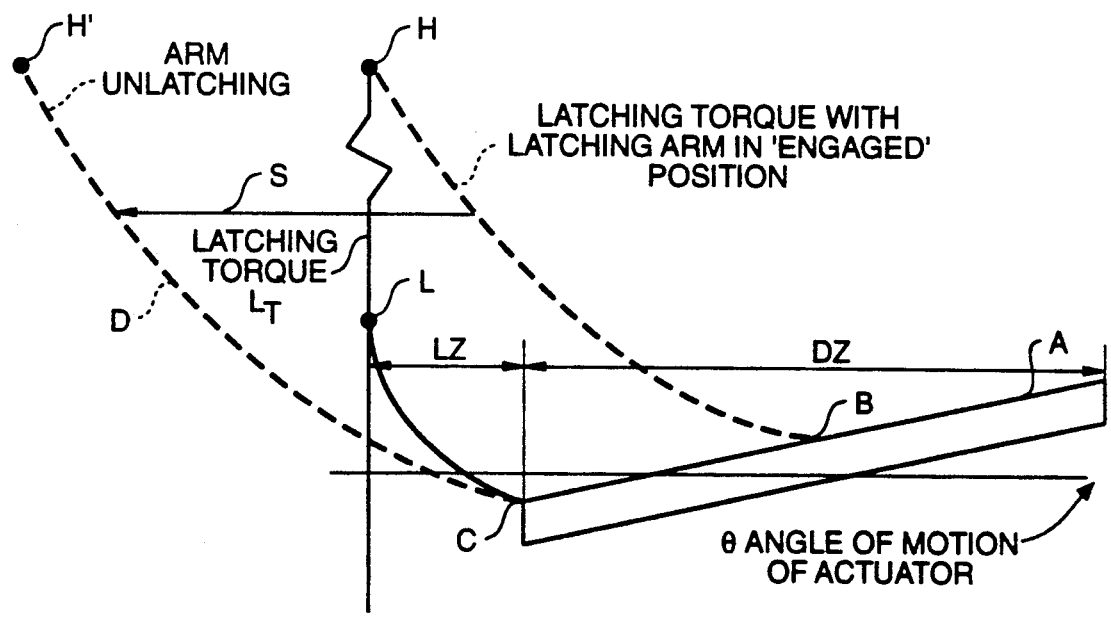
FIG._13

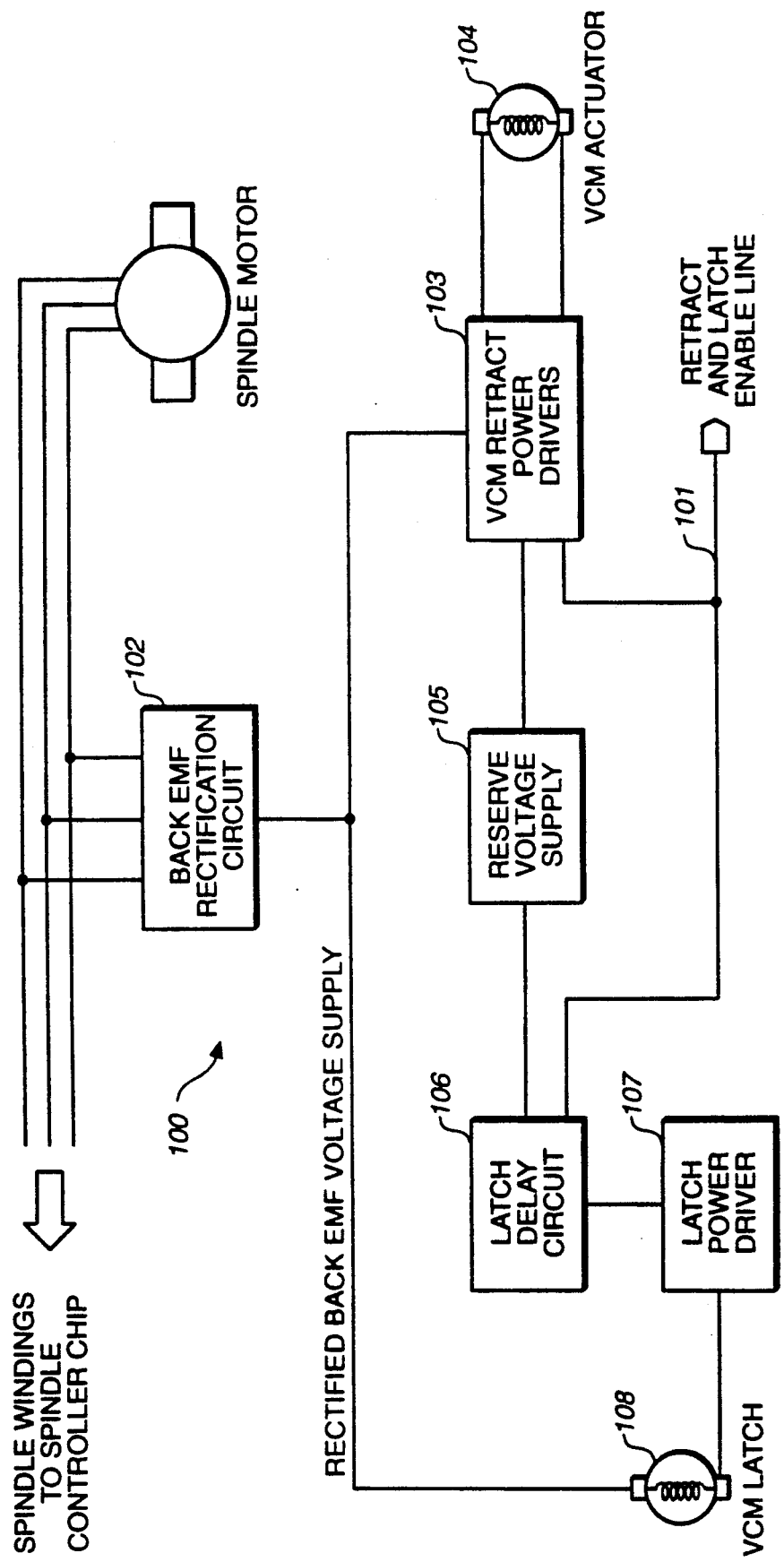
FIG._14

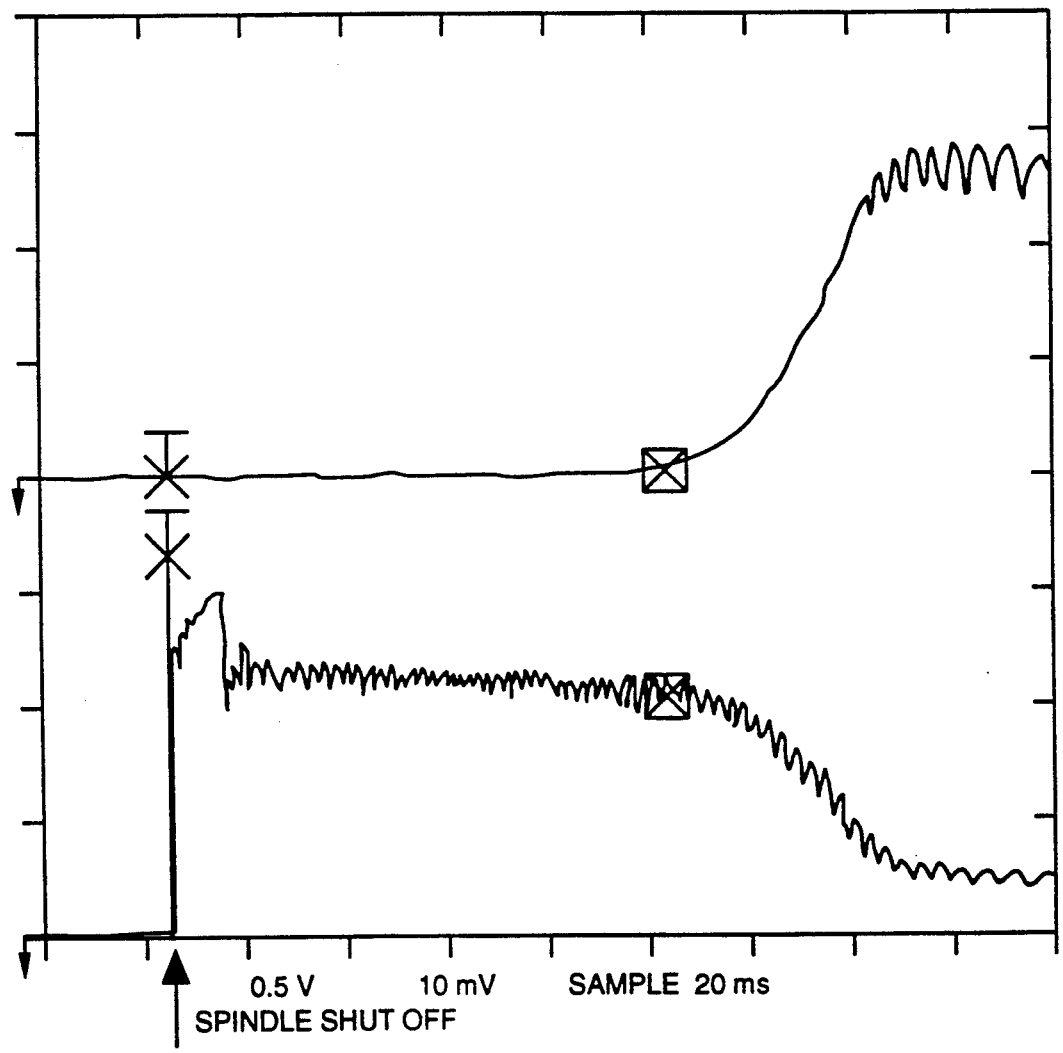
FIG._15

ACTIVE MAGNETIC LATCH FOR DISK DRIVE AND METHOD

BACKGROUND OF THE INVENTION

This invention pertains to shock protection of disk drives. More particularly the invention is directed to an apparatus and method of effectively locking a disk drive actuator in a parking position so that the actuator is immovable when subjected to relatively high shock loadings.

The present invention particularly finds utility in magnetic memory storage disk drives utilizing a voice coil motor-driven rotary actuator having read/write transducers accessing one or more disks, normally on both surfaces of the disk. Upon powering down of the actuator, the actuator and its attached read/write transducers is driven to a parking position or landing zone normally at the I.D. of the circular memory storage "tracks" on the disk. When the power is shut down, the actuator when subjected to jars, shocks or vibrations, may pivot damaging the tranducer heads and the magnetic surfaces on the adjacent disk(s). While the invention is described in terms of magnetic data storage disks, optical transducer(s) may also be incorporated in the actuator and the actuator appropriately parked and locked using the invention.

Various systems for moving a rotary actuator to a parking position and locking the actuator at that position have been employed. It is known (U.S. Pat. No. 4,679,102) to employ the back EMF of a disk-driving spindle motor as it spins down to drive a stepper motor so that the stepper motor moves the actuator to the parking position.

U.S. Pat. No. 4,654,735 describes latch elements including detents for holding the actuator and its transducer heads latched in an inoperative landing position against a stop. Triggering of the latch has been accomplished by use of a charged capacitor energizing the coil of a voice-coil motor or by a coil current (back EMF) generated by a spindle motor coasting to a halt whenever the power thereto is purposely or inadvertently shut off. An over-center toggle spring has been employed with a spring force chosen so that the latching force is great enough not to be overcome by jolts or shocks of some force but small enough to be overcome by the forces in the voice coil motor when it is energized to move during normal head-positioning operation. The '735 patent also describes that the spring urges the latch to a latched position.

A magnet as seen in U.S. Pat. No. 4,594,627 has also been employed to magnetically attach a bobbin of a voice-coil linear motor to a limit stop with the linear motor upon start-up having sufficient power to overcome the magnetic attraction of the contacting magnet and stop. U.S. Pat. No. 4,751,595 describes the use of a solenoid to move a locking position lever into a locking upon the turning-off of a disk drive actuator.

Specifications for a disk drive using the present invention include a requirement that the drive withstand an operating shock loading of 10 G's and non-operating (latched position) shock load from dropping or jarring of 300 G's plus angular accelerations of from about 10,000 to 20,000 radians per second per second from dropping on a corner of the drive or computer. Miniaturization of disk drives have compounded the latch problem faced by design engineers. For example, the above specifications further recite an overall disk drive envelope size of 70 mm long, 50.0 mm wide and 12.5 mm thick which accommodates one 1.8 inch diameter disk [48 mm] providing up to 40 Mb of magnetic storage. The foot print of the disk drive actually is smaller than a business card.

With few exceptions the prior art constructions have used a so-called "passive" latch where two magnetic parts or other latch such as a solenoid-operated latch lever are brought into physical contact—magnet-to-pole piece or lever finger-to-detent.

FIG. 13 schematically illustrates the effect of having a high actuator torque required to disengage a prior art latch, e.g. a magnet-to-pole piece contacting or nearly contacting latch, on start-up of the drive. The latch torque $L_T$ is plotted against the angle $\theta$ motion of the rotary actuator. The distance LZ represents the landing zone or parking position of the actuator and the distance DZ represents the essentially radial data zone of the disk. The desired track of the actuator across the disk data storage tracks is shown by the closed loop A which is effected by normal bias forces due to friction in the actuator bearings, bias from the flexing of the flex circuit, and windage. If one employs a high latching torque H, the application of the approximate square law for the force decrease versus the distance between the latching elements would mean that the actuator heads would intersect the loop A approximately at point B resulting in lost disk space. Thus in prior art devices the designer in order to save the data storage area and minimize the landing zone LZ generally will accept the use of a low latching torque L so that the plot intersects loop A at point C.

SUMMARY OF THE INVENTION

During non-operating shock exposure, it is important that the actuator be latched so that the transducer heads are prevented from sliding over data tracks, possibly scratching the disk surface and damaging customer data. Shocks can be applied in three directions, two orthogonal directions in the plane of the disk and the third being perpendicular to the lane of the disk (axial direction). In addition to linear shocks mentioned above, there is also the possibility of rotational shocks, along three orthogonal axes. For linear shocks in the plane of the disk, unbalance of the actuator will create a moment loading of the actuator which will tend to rotate the actuator from the preferred "landing zone" area. While actuators are typically designed to be balanced (e.g. at the pivot) out of tolerances effects will create unbalances. Linear shocks perpendicular to the disk generate no moments which tend to rotate the actuator.

With the drive power off, the actuator of the drive is positioned against the inner diameter (I.D.) crash stop with the heads safety parked in a "landing zone". Upon power up, after the disk is up to speed, the present invention utilizes the force available in the actuator voice coil motor, which drives the rotary actuator arm (and associated read/write transducers) of the disk drive to unlatch a magnetic latch holding the actuator against and I.D. stop. A torsion spring provides a bias to a latch arm forcing the latch arm away from the latch position to an unlatched (actuator operational) position. When the disk drive is powered down the disk spindle motor back EMF, resulting from the spinning down of the spindle motor, moves the actuator to the parking position against the I.D. stop, and applies current to a second voice coil forming part of a magnetic circuit in the latch arm which overcomes the spring bias of the torsion spring. This brings a latch permanent magnet to the latch arm into spaced proximity to a ferrous member on the actuator arm providing a magnetic holding force therebetween. The magnet and ferrous member do not physically contact or touch, thus permitting reasonable actuator voice coil current to "break" the magnetic force at start up, with the bias of the torsion spring then moving the latch arm to an unlatched position.

Referring again to FIG. 13 the present invention provides a high latching torque such as H' without the penalty of lost disk space. The latch torque curve is shifted because the space between the latch magnet and ferrous member on the actuator is so great and thus the latching force curve is shifted as shown by arrow S to the position D, the landing zone LZ is not affected and no undesirable latching biases are present over the data zone DZ. The curve shifting is also predicated on the torsion spring bias moving the latch magnet to the unlatched position. The spaced magnetic latch of the invention is thus not a cause of loss of any data storage territory.

The entire latch is part of a sub-assembly and is mounted generally above a printed circuit board (PCB) placed in the disk drive casing. A latch flex circuit extends from an exposed corner of the PCB to a latch voice coil on one end of the latch arm. A latch arm shaft is attached to a lower base plate of ferrous material (steel) and in a preferred embodiment a first permanent magnet is bonded to the base plate. The torsion spring is placed over the shaft and attached at one end to the base plate and at the other end to a latch arm assembly placed on the shaft. The latch arm includes a second permanent magnet at its other end, hereafter called the "latch magnet", in a keeper. An upper ferrous member or thin plate of about 0.5 mm thick steel has depending legs which fit into notches in the lower base plate. The combination of the base plate, the first magnet, the latch voice coil and the upper plate and the spindle motor back EMF all form a magnetic circuit for moving the latch arm to overcome the spring bias. The magnetic attraction between the base plate and upper plate is enough to keep the parts together during assembly. A compliant part (elastomeric donut) between the disk drive top cover and the upper plate mechanical holds the parts together after complete assembly. The shaft is elongated so it protrudes through a hole in the base plate, providing a pivot for adjustment of the clearance (gap) between the latch magnet and the ferrous member thereby adjusting the latching force to a consistent value. The screw hole in the base plate by which the base plate is attached to the disk drive casing base, is slotted allowing adjustment of the latch arm so as to adjust the gap between the latch magnet and the ferrous member on the actuator arm in the latch position. The above features permit a design having desirable relatively low tolerances and can be operated by the use of a very low currents of about 0.06 amps and 0.2 amps available to the actuator motor and latch voice coil from the back EMF of a rotating spindle motor, respectively.

Further, with the present invention, particularly due to the spring-biased movement of the magnetic field latch away from actuator arm, there is no need of having the latch powered during rotary actuator read-write operation or after shut-down resulting in no drain of battery power during these operational modes. Additionally, the present invention provides the benefit of a high latch torque (latch holding force) without the loss of disk data storage space or "real estate." In addition, wear and friction are minimized since there is no physical contact of the latching elements. Only the pivot and shaft are subjected to low loads.

BRIEF DESCRIPTION OF THE DRAWINGS

FIG. 1 is a simplified plan view of the disk drive overall construction at the I.D. stop.

FIG. 2 is a partial blown-up plan view of the disk drive actuator and latching assembly at the I.D. stop and latched.

FIG. 3 is a plan view of the disk drive actuator at the I.D. stop and showing the latched and unlatched portions of the latch arm.

FIG. 4 is a partial cross-sectional elevational view of the disk drive casing and associated latching assembly of FIG. 3.

FIG. 5 is an elevational view of the latch base plate, shaft and torsion spring sub-assembly.

FIG. 6 is a plan view of the latch base plate sub-assembly.

FIG. 7 is a plan view of the base plate and assembled latch arm.

FIG. 8 is a side elevational view of the base and latch arm assembly with the magnetic upper plate.

FIG. 9 is a plan view of the latch arm with included latch arm coil.

FIG. 10 is a plan view of the magnetic circuit upper plate.

FIG. 11 is an elevational view of the upper plate.

FIG. 12 is a partial side elevational view of a second embodiment of the latch arm including an attached drive magnet.

FIG. 13 is a plot of latching torque against the angular motion of the actuator arm.

FIG. 14 is a block diagram of the basic elements of the electronic control circuitry of a voice coil motor disk drive with the back EMF of a spindle motor connected to the actuator voice coil and to the latch arm coil.

FIG. 15 is a plot of voice coil voltage and time and latch current and time showing the sequence of parking and latching the actuator.

DETAILED DESCRIPTION

A disk drive assembly 10 is shown in simplified form in FIG. 1 wherein a rectangular casing base 11 includes a peripheral edge 11a for receipt of corresponding edges of a casing cover 12 (FIG. 4). A printed circuit board (not shown) contains a microprocessor and other electronic circuit elements and conductive pathways/sockets, as known in the art. One or more disks 31 in a disk assembly 30 is mounted within the confines of housing 11, 12 and driven by a disk drive shaft 33 extending from spindle motor 32. A disk clamp 33a fixes the disk on the spindle.

The disk(s) are accessed by a rotary actuator 40 including a voice-coil motor 43 (VCM) at one end and an actuator head arm 41 at the other end mounting a series of read and write transducers 42 typically in a head assembly as is known in the art. In accord with the invention an additional ferrous member 45 is provided on an extension arm 44 extending from the actuator arm. FIG. 1 additionally shows the rotary arc movement (arrow 47) of actuator 40 around pivot 46 indicating an operational position of arm 41 and voice coil 43 against I.D. stop 14. In a parking position the arm 41 and coil 43 particularly portion 41a abuts against I.D. crash stop 15 when arm 44 is brought into proximity (FIG. 2) with the latch arm assembly 50 in the latch position thereof. The crash stops 14 and 15 are made of urethane plastic with a preferable durometer of 50-55A held by a vertical pin which for corrosion purposes is coated with an electroless nickel coating of 0.005 mm in accord with MIL-C-26074. Not forming part of the present invention but shown in FIGS. 1 and 2 is connector pin block 48 and flex circuit 49.

As seen in FIGS. 2 and 3 latch arm assembly 50 includes the pivotable latch arm 51 which pivots around shaft 39. The pivoted movement of the latch arm is from the dash line unlatched position of the arm denoted as 51′ to the full line latch position of arm 51 about shaft 39. A first end of the latch arm includes a coil aperture 51a in which a voice coil 53 (FIG. 7) is attached by bonding or encapsulating (molded-in-place). A latch flex circuit connector strip 58 connects latch voice coil 21 to connector pins 59a on the PCB. A second end of the latch arm includes a rectangular keeper 56 into which a latch magnet 55 is inserted and bonded in place with a structural adhesive such as Loctite Speed Bonder ™ 326 Item No. 32629 available from Loctite Canada, Miss., Ontario, Canada. The latch magnet is typically a high energy product rare earth magnet such as neodymium/iron parallel to and spaced away from the ferrous member outer face. The magnet may be a NEOMAX-32H magnet of 32 M gauss with an electrodeposited nickel layer of 0.015±0.005 mm (QQ-N-290A) thereover, available from Sumitomo Special Metals of Japan. The keeper 56 also functions to shunt the latch magnet package field from other components of the disk drive including the disks 31 containing the magnetic data storage media thereon.

A ferrous base plate 23 of steel material shown in more detail in FIGS. 5 and 6, forms part of a base plate sub-assembly 20 which is mounted above the PCB. The base plate containing sub-assembly 20 includes a permanent magnet 21 hereafter called the "drive magnet" constructed of neodymium iron magnetic material as above bonded to one end of base plate 23 by Speed Bonder 326 adhesive. The other end of base plate 23 contains a pair of spaced facing arms 24, 25 having respective pin stops 18, 19 on their distal ends. An oval or other shaped offset slot 22 permits adjustment of the latch arm as seen in FIG. 2 to change the width typically 0.5 mm of gap 59. A spring-holding tab 26, a shaft aperture 27 and three edge notches 28, 29 and 29a are also included. A torsion spring 34 is mounted over shaft 39 after the shaft has been fixed in base plate 23 by press-fitting. One fixed end 36 of the torsion spring 34 is held in tab 26 while the other movable end 35 is subsequently fitted (FIG. 7) into a side edge slot 54a in an integral pin 54 depending from latch arm 51.

FIG. 8 illustrates the assembly of an upper plate 61 having depending legs 62, bottom edges 63 of which fit into notches 28, 29 of the base plate (FIG. 6) to locate and support the upper plate. The middle leg is spaced from the base plate so that in final assembly a three-point support including shaft 39 is provided.

FIG. 9 more clearly shows the details of latch arm 51. Stop pin 67 is molded on and depends from a cantilevered arm 66 on latch arm 51 and is movable between stops 19, 18 (FIG. 7). Likewise the spring-holding pin 54 is molded on the latch arm 51 with the spring 34 biasing the latch arm to the unlatched position. The latch arm is preferably molded of 20% Teflon ®-filled acetal plastic such as DELRIN ® plastic manufactured by LNP Corporation under Brand No. KL 4050. Such material has good friction and wear characteristics and is silicone-free so that it does not outgas and contaminate the enclosure.

The entire base plate 23 and latch arm assembly 50 may be rotated slightly with respect to drive lower casing 11 to adjust the gap 59 (FIG. 2) between the ferrous member 45 and magnet face 55a and thus the magnetic attraction and actuator-holding magnetic force therebetween. A common screw 68 holds the overall latch down and also serves as a third screw holding the PCB 69 in the casing base 11. Flex circuit solder pins 58a connect the flex circuit 58 to the voice coil 53.

FIGS. 10 and 11 show the upper plate per se. An upper plate aperture 64 fits over a trunnion 65 (FIG. 5) of shaft 39 to provide three-point support for the upper plate. A donut or other gasket 66 of elastomeric foam material is placed between the top surface of plate 61 and the underside of cover 12 which is compressible by the screw attachment (not shown) of the cover 12 to the casing base 11 to further secure upper plate 61. A registration hole is provided in base 11 to receive the lower end of shaft 39 and a label 91 (FIG. 8) adhesively attached to the casing bottom, covering the hole and sealing the shaft end.

FIG. 12 shows a second embodiment of the latch arm where the latch arm 81 and extension 82 mount a permanent magnet 83 rather than a voice coil 84. Voice coil 84 rather is fixed to a support 85 extending above the PCB 87 and mag plate 86 and connected by fixed wiring 89 to the PCB. Thus a flex circuit 58 as seen in the FIG. 9 embodiment is not necessary. This design can result in undesirable magnetic forces which can create friction and wear problems particularly between the shaft top and bottom and the upper and lower parts of the surrounding latch arm 81 aperture 88.

While not shown, it is contemplated that a pivoted relay can be employed where a solenoid enabled by the spindle motor back EMF attracts a steel edge on the latching arm to overcome the torsion spring bias.

FIG. 14 illustrates the actuator retract and latch circuit 100. The retract and latch circuit 100 provides the electronics to park (retract) the VCM actuator and to sequentially latch the VCM actuator in place for non-operating conditions. "Parking" the actuator means moving the VCM the head assembly to the inner diameter (I.D.) of the disks; the head landing area.

The retract and latch function described here occurs automatically only on one condition. That condition is when the spindle motor is shut down. There are, however, two cases when the spindle motor is shut down. One, when system power is lost and a system reset occurs, and two, when the spindle is commanded by the microprocessor to shut down. In both these cases, the retract and latch function begins once the spindle is shut off.

The spindle is shut off via the spindle motor enable line 101 to the spindle controller chip. This line also acts as an enable line for the retract and latch circuit. When the spindle is shut off, a voltage is still generated in the spindle windings until the spindle motor stops rotating. This voltage is called the back EMF voltage and is used to power the VCM actuator and VCM latch during the retract and latch function. The VCM actuator refers to the head assembly actuator 40 and the VCM latch refers to the latch assembly 50.

This back EMF voltage is rectified from the three spindle windings by a rectification and filtering circuit 102. The voltage is then fed to the VCM actuator power drivers and the VCM latch. The retract and latch enable line, which has been activated by the shut down of the spindle, immediately enables the VCM actuator power drivers 103. The power drivers are kept operational by a reserve voltage source 105, which is essentially a stored voltage. With the VCM actuator power drivers enable, the rectified back EMF voltage supply is applied to the VCM actuator 104 to move (retract) the head assembly to the I.D. stop.

At the same time the retract and latch enable line enables the VCM actuator power drivers, the same enable line enables a delay circuit 106 for the VCM latch. This circuit delays the enabling of the VCM latch power driver 107 until after a settable amount of time. This delay allows the VCM actuator and head assembly to retract to the I.D. landing zone before the VCM latch 108 is engaged. Once the delay has occurred, the VCM latch power driver 107 is enabled allowing the rectified back EMF voltage to be applied to the VCM latch 108. The applied voltage moves the VCM latch to a position were the latch assembly 50 and 55 magnetically catches and holds the VCM actuator arm assembly 40, 44 and 45 against I.D. stop 15. The ferrous member 45 of the actuator is in parking position before or at the same time as the latch magnet arrives at the spaced latching position having overcome the torsion spring bias.

It should be noted that this circuit is only used for the retract and latch function. The VCM actuator assembly is unlatched by applying current to the VCM actuator 104 through the normal VCM controller chip (not shown) when the drive has power.

FIG. 15 illustrates the above operation showing spindle motor shut off, the voltage applied first to the actuator voice coil motor for retracting the actuator to the I.D. stop, a delay time of about 100 ms. and subsequent turn on of the latch current which permits the latch arm voice coil motor to overcome the bias of the unlatching torsion spring, and bringing latch magnet 55 into magnetic attraction with the ferrous member 45 to hold the actuator assembly 40 against the I.D. stop 15 (FIG. 2). These plots were made utilizing a Tektronix 2232 plotter.

The above description of the preferred embodiment of this invention is intended to be illustrative and not limiting. Other embodiments of this invention will be obvious to those skilled in the art in view of the above disclosure.

We claim:

1. In combination a disk drive comprising at least one disk driven by a spindle motor, a rotary actuator including read and write heads for accessing data storage tracks on the at least one disk, an actuator voice coil motor for rotationally and incrementally driving said actuator, and means including the actuator voice coil motor for driving said actuator and read and write heads to a parking position against a parking stop; and a magnetic latch for latching the actuator against the parking stop to prevent shock induced movement of the actuator and read and write heads from the parking stop, said magnetic latch comprising:

a ferrous member extending from said actuator;
a pivotable latching arm spacedly juxtaposed from said ferrous member, said latching arm having a latch magnet fixedly attached to said latching arm, said magnet being spaced from said ferrous member;
means including a latch voice coil for moving said latching arm and said latch magnet from an unlatched position spaced from said ferrous member to a latch position more closely spaced from said ferrous member where a magnetic force of said latch magnet holds the actuator against the parking stop; and
means for unlatching said magnetic latch.

2. The combination of claim 1 in which said means for unlatching comprises said actuator voice coil motor and means for energizing the actuator voice coil motor with sufficient power to overcome the magnetic force between said latch magnet and said ferrous member.

3. The combination of claim 1 wherein said spindle motor generates a back EMF upon spinning down, said back EMF enabling said actuator voice coil motor for driving said actuator to the parking position and enabling said latch voice coil for moving said latching arm to the latch position.

4. The combination of claim 3 including a time delay circuit which delays enablement of said latch voice coil after enablement of said actuator voice coil motor.

5. In combination a disk drive comprising at least one disk driven by a spindle motor, a rotary actuator including read and write heads for accessing data storage tracks on the at least one disk, an actuator voice coil motor for rotationally and incrementally driving said actuator, and means including the actuator voice coil motor for driving said actuator and read and write heads to a parking position against a parking stop; and a magnetic latch for latching the actuator against the parking stop to prevent shock induced movement of the actuator and read and write heads from the parking stop, said magnetic latch comprising:

a ferrous member extending from said actuator;
a latching arm spacedly juxtaposed from said ferrous member, said latching arm having a latch magnet spaced from said ferrous member;
means for moving said latching arm and said latch magnet from an unlatched position spaced from said ferrous member to a latch position more closely spaced from said ferrous member where a magnetic force of said latch magnet holds the actuator against the parking stop;
means for unlatching said magnetic latch;
further including a latch voice coil motor including a latch voice coil and permanent magnet; and
wherein said latching arm includes means for mounting the latch voice coil thereon and said permanent magnet is fixed in the disk drive.

6. In combination a disk drive comprising at least one disk driven by a spindle motor, a rotary actuator including read and write heads for accessing data storage tracks on the at least one disk, an actuator voice coil motor for rotationally and incrementally driving said actuator, and means including the actuator voice coil motor for driving said actuator and read and write heads to a parking position against a parking stop; and a magnetic latch for latching the actuator against the parking stop to prevent shock induced movement of the actuator and read and write heads from the parking stop, said magnetic latch comprising:

a ferrous member extending from said actuator;

a latching arm spacedly juxtaposed from said ferrous member, said latching arm having a latch magnet spaced from said ferrous member;

means for moving said latching arm and said latch magnet from an unlatched position spaced from said ferrous member to a latch position more closely spaced from said ferrous member where a magnetic force of said latch magnet holds the actuator against the parking stop;

means for unlatching said magnetic latch;

further including a latch voice coil motor including a latch voice coil and a permanent magnet; and wherein said latching arm includes means for mounting the permanent magnet thereon and said latch voice coil is fixed in the disk drive.

7. A disk drive having at least one disk driven by a spindle motor and a voice coil actuator for accessing data storage tracks on the at least one disk; means for driving the actuator to a parking position; a pivotable latching arm including a latch magnet spacially juxtaposed from said actuator, said arm being spring biased to an unlatching position with respect to said actuator; and means for sequentially driving said latching arm and latch magnet to a latch position spaced from said actuator when said actuator is at the parking position.

8. A disk drive having at least one disk driven by a spindle motor and a voice coil actuator for accessing data storage tracks on the at least one disk; means for driving the actuator to a parking position; a latching arm including a latch magnet spacially juxtaposed from said actuator, said arm being spring biased to an unlatching position with respect to said actuator; and means for sequentially driving said latching arm and latch magnet to a latch position from said actuator when said actuator is at the parking position; and in which a back EMF resultant from a spinning down of the spindle motor first enables said voice coil actuator for driving said voice coil actuator to the parking position and second enables a latch voice coil motor included in the means for sequentially driving said latching arm and latch magnet.

9. The method of latching a rotary disk drive actuator against a fixed parking stop, said actuator having an actuator arm driven by a voice coil motor; a spaced latch arm including an associated permanent magnet and an associated latch voice coil; and a spindle motor driving a data storage disk comprising:

a) retracting the actuator arm from a first operational position adjacent data storage tracks on the disk to a second parking position removed from said tracks and abutting the fixed parking stop;

b) spring biasing the latch arm to a spaced unlatched position with respect to the actuator arm;

c) spinning down the spindle motor;

d) directing a back EMF current from the spindle motor generated by the spinning down of the spindle motor to the latch voice coil associated with the latch arm to move the latch arm and the permanent magnet to a first spaced latch position with respect to the actuator arm at said second parking position;

e) magnetically attracting the actuator arm against the parking stop by a magnetic field created by said permanent magnet to resist shock movement of the actuator arm;

f) powering up said voice coil motor to overcome the magnetic attraction of said magnetic field between the actuator arm and said permanent magnet;

g) moving the actuator arm toward the first position, and h) permitting the spring bias applied to the latch arm in step (b) to return the latch arm to the unlatched position.

10. The method of claim 9 in which step a) is performed by directing part of the back EMF from said spindle motor in step d) to said voice coil motor.

11. In combination a disk drive comprising at least one disk driven by a spindle motor, a rotary actuator including read and write heads for accessing data storage tracks on the at least one disk, an actuator voice coil motor for rotationally and incrementally driving said actuator, and means including the actuator voice coil motor for driving said actuator and read and write heads to a parking position against a parking stop; and a magnetic latch for latching the actuator against the parking stop to prevent shock induced movement of the actuator and read and write heads from the parking stop, said magnetic latch comprising:

a ferrous member extending from said actuator;

a latching arm spacedly juxtaposed from said ferrous member, said latching arm having a latch magnet spaced from said ferrous member;

means for moving said latching arm and said latch magnet from an unlatched position spaced from said ferrous member to a latch position more closely spaced from said ferrous member where a magnetic force of said latch magnet holds the actuator against the parking stop;

means for unlatching said magnetic latch; and wherein said latching arm further comprises an elongated pivotable arm, a distal end of the pivotable arm mounting said latch magnet, and in which said means for moving said latching arm includes a latch voice coil associated with an opposite end of the pivotable arm forming part of a magnetic circuit and wherein said spindle motor generates a back EMF when power is removed therefrom, said back EMF being coupled to said latch voice coil to drivingly pivot said pivotable arm and said latch magnet to the latch position.

12. The combination of claim 11 further including a base plate pivotally mounting said pivotable arm, and wherein said means for unlatching includes a torsion spring having a first end fixedly attached to said base plate and a second end fixed to said pivotable arm, said torsion spring normally providing a spring bias to move said latching arm to the unlatched position and wherein said latch voice coil when powered by said generated back EMF overcomes the spring bias to move said latching arm and said latch magnet to the latch position with said ferrous member.

13. The combination of claim 12 wherein said pivotable arm includes a stop pin and said base plate includes a pair of tab stops, said stop pin abutting respective ones of said tab stops in the latch position and in the unlatched position.

14. The combination of claim 13 in which said pivotably arm includes an upstanding spring end attaching boss for holding said torsion spring second end.

15. The combination of claim 14 in which said boss includes an edge slot for receipt of a portion of said torsion spring second end.

16. The combination of claim 13 wherein said base plate includes an offset slot for spatial adjustment of said base plate with respect to the parking stop and adjustment of the spacing between said ferrous member and said latch magnet in the latch position.

17. The combination of claim 12 further including a pivot shaft extending between said base plate and an upper plate, said pivotable arm being pivoted about said shaft, and at least one drive permanent magnet positioned on said base plate below a latch voice coil and forming part of a magnetic circuit.

18. The combination of claim 17 in which said upper plate is held by magnetic attraction on said pivot shaft.

19. The combination of claim 18 further including a top cover extending over said upper plate and a compressible foam gasket extending between said cover and said upper plate.

20. The combination of claim 17 wherein said base plate and said upper plate are of ferrous construction and are part of the magnetic circuit.

21. The combination of claim 17 wherein said base plate includes at least a pair of notches and said upper plate includes at least a pair of depending legs each having a distal end fitting into respective ones of said base plate notches.

22. The combination of claim 12 wherein said pivotable arm includes a stop pin and said base plate includes a pair of tab stops, said stop pin abutting respective ones of said tab stops in the latch position and in the unlatched position.

23. The combination of claim 11 wherein the opposite end of said pivotable arm includes a coil aperture, said latch voice coil being positioned in said coil aperture.

24. The combination of claim 11 wherein said distal end of the pivotable arm includes a magnet keeper for holding said latch magnet, said keeper being constructed and arranged to prevent magnetic flux interference from the latch magnet with the at least one disk in both the latch position and unlatched position.

25. The combination of claim 11 in which said means for driving said actuator to a parking position against the parking stop further includes said back EMF from said spindle motor enabling said actuator voice coil motor.

26. The combination of claim 25 in which means for coupling said back EMF sequentially enables first said actuator voice coil motor and then said latch voice coil.

27. The combination of claim 26 including a time delay circuit which delays enablement of said latch voice coil.

* * * * *